(12) United States Patent
Kim et al.

(10) Patent No.: US 11,794,550 B2
(45) Date of Patent: *Oct. 24, 2023

(54) HEAT PUMP SYSTEM FOR VEHICLE

(71) Applicants: Hyundai Motor Company, Seoul (KR); Kia Corporation, Seoul (KR)

(72) Inventors: Yeonho Kim, Seoul (KR); Jae Yeon Kim, Hwaseong-si (KR); Wan Je Cho, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 130 days.

This patent is subject to a terminal disclaimer.

(21) Appl. No.: 17/514,407

(22) Filed: Oct. 29, 2021

(65) Prior Publication Data

US 2022/0379681 A1 Dec. 1, 2022

(30) Foreign Application Priority Data

May 31, 2021 (KR) .................. 10-2021-0070375

(51) Int. Cl.
*B60H 1/00* (2006.01)
*B60H 1/14* (2006.01)
*B60H 1/32* (2006.01)

(52) U.S. Cl.
CPC ..... *B60H 1/00278* (2013.01); *B60H 1/00485* (2013.01); *B60H 1/00492* (2013.01);
(Continued)

(58) Field of Classification Search
CPC ............ B60H 1/00278; B60H 1/00485; B60H 1/00492; B60H 1/00914; B60H 1/143; B60H 1/034; B60H 1/3213; B60H 1/00807; B60H 1/00885; B60H 1/00899; B60H 1/00392; B60H 1/00921; B60H 1/32284;
(Continued)

(56) References Cited

U.S. PATENT DOCUMENTS 9,109,840 B2 * 8/2015 Kadle ................ B60H 1/32284
9,239,193 B2 * 1/2016 Kadle ..................... F28B 9/005
(Continued)

FOREIGN PATENT DOCUMENTS

CN  108407568 A  *  8/2018  ......... B60H 1/00007
CN  113071376 A  *  7/2021
(Continued)

*Primary Examiner* — Jenna M Hopkins
(74) *Attorney, Agent, or Firm* — MORGAN, LEWIS & BOCKIUS LLP

(57) ABSTRACT

A heat pump system for a vehicle, capable of heating up or cooling a battery module by use of a single chiller in which a refrigerant and a coolant exchange heat, simplifying the system, includes: first and second cooling apparatuses; and a battery module, wherein a main heat exchanger provided in an air conditioning apparatus is connected to each of the first and second coolant lines to enable the coolants circulating in the first and second cooling apparatuses to pass therethrough, and a refrigerant passing through the main heat exchanger is selectively condensed or evaporated depending on a vehicle mode through mutual heat exchange with the coolant supplied from one of the first coolant line and the second coolant line, or the coolants supplied through the first and second coolant lines, respectively.

16 Claims, 2 Drawing Sheets

(52) U.S. Cl.
CPC ......... B60H 1/00914 (2013.01); B60H 1/143 (2013.01); B60H 1/3213 (2013.01); *B60H 2001/00307* (2013.01); *B60H 2001/00928* (2013.01)

(58) Field of Classification Search
CPC ............ B60H 1/00007; B60H 1/00428; B60H 1/00571; B60H 1/03; B60H 1/3211; B60H 1/004; B60H 1/00871; B60H 2001/00307; B60H 2001/00928; B60H 2001/00949; B60H 2001/00121; B60H 2001/3267; B60H 2001/00942; B60H 2001/005; B60H 2001/00957; B60K 1/00; B60K 2001/005; Y02T 10/70; Y02E 30/10; H01M 10/613; H01M 10/66; H01M 10/663; H01M 10/6567; B60L 2270/46
See application file for complete search history.

(56) References Cited

U.S. PATENT DOCUMENTS

| | | | | |
|---|---|---|---|---|
| 11,383,577 | B2 * | 7/2022 | Lee | B60L 58/26 |
| 2012/0216562 | A1 * | 8/2012 | Kadle | F28D 9/0093 |
| | | | | 62/434 |
| 2012/0222846 | A1 * | 9/2012 | Kadle | F25B 39/04 |
| | | | | 165/166 |
| 2013/0283838 | A1 * | 10/2013 | Kadle | F28D 9/0093 |
| | | | | 62/509 |
| 2019/0176572 | A1 * | 6/2019 | Kim | B60H 1/00428 |
| 2020/0180390 | A1 * | 6/2020 | Kim | B60H 1/00278 |
| 2020/0180391 | A1 * | 6/2020 | Kim | B60H 1/3223 |
| 2021/0001688 | A1 * | 1/2021 | Kim | B60H 1/143 |
| 2021/0252942 | A1 * | 8/2021 | Jeong | B60H 1/00278 |
| 2022/0088990 | A1 * | 3/2022 | Kim | B60H 1/3223 |
| 2022/0088991 | A1 * | 3/2022 | Kim | B60H 1/03 |
| 2022/0379681 | A1 * | 12/2022 | Kim | B60H 1/00278 |

FOREIGN PATENT DOCUMENTS

| | | | | | |
|---|---|---|---|---|---|
| CN | 113119680 | A | * | 7/2021 | ......... B60H 1/00257 |
| CN | 113263884 | A | * | 8/2021 | ......... B60H 1/00278 |
| KR | 20210082858 | A | * | 7/2021 | |
| KR | 20210096420 | A | * | 8/2021 | |
| KR | 20210107361 | A | * | 9/2021 | |
| KR | 20220139758 | A | * | 10/2022 | |
| KR | 102470436 | B1 | * | 11/2022 | |
| KR | 20220152604 | A | * | 11/2022 | |
| KR | 20220162241 | A | * | 12/2022 | |
| WO | WO-2016072719 | A1 | * | 5/2016 | ......... B60H 1/00278 |

* cited by examiner

HEAT PUMP SYSTEM FOR VEHICLE

CROSS-REFERENCE TO RELATED APPLICATION

The present application claims priority to Korean Patent Application No. 10-2021-0070375 filed on May 31, 2021, the entire contents of which is incorporated herein for all purposes by this reference.

BACKGROUND OF THE INVENTION

Field of the Invention

The present invention relates to a vehicle heat pump system for a vehicle, and more particularly, to a heat pump system for a vehicle, which heats or cools a battery module by use of a single chiller in which a refrigerant and a coolant exchange heat, and improves heating efficiency by use of waste heat from a motor, an electrical component, and a battery module.

Description of Related Art

In general, an air conditioning apparatus of a vehicle includes an air conditioner system for circulating a coolant or a refrigerant to heat or cool an interior of the vehicle.

Such an air conditioning apparatus, which can maintain a fresh indoor condition by maintaining an indoor temperature of a vehicle at an appropriate temperature regardless of an outdoor temperature change, is configured to heat or cool an interior of the vehicle by heat-exchange by an evaporator during a process in which a refrigerant discharged by driving a compressor is circulated to the compressor again by passing through a condenser, a receiver drier, an expansion valve, and the evaporator.

That is, in the air conditioning apparatus, a high-temperature and high-pressure gaseous refrigerant which is compressed by the compressor is condensed through the condenser, then is evaporated by the evaporator through the receiver drier and the expansion valve to lower the indoor temperature and humidity in a cooling mode.

Recently, as a concern about energy efficiency and environmental pollution has gradually increased, development of an environment-friendly vehicle configured for being substantially substituted for a vehicle having an internal combustion engine has been required, and the environment-friendly vehicles are typically classified into an electric vehicle which is typically driven using a fuel cell or electricity as a power source, and a hybrid vehicle which is driven using an engine and an electric battery.

In the electric vehicle and the hybrid vehicle of the environment-friendly vehicles, a separate heater is not used, unlike an air conditioner of a general vehicle, and an air conditioner, which is applied to the environment-friendly vehicle, is typically referred to as a heat pump system.

In a case of the electric vehicle using the fuel cell, chemical reaction energy of oxygen and hydrogen is converted into electrical energy to generate driving force, and during the present process, thermal energy is generated by chemical reaction in the fuel cell, and as a result, effective removal of the generated heat is required to secure the performance of the fuel cell.

Even in the hybrid vehicle, the driving force is generated by driving the motor by use of electricity supplied from the fuel cell or the electric battery together with the engine which is actuated with a general fuel, and as a result, the performance of the motor may be secured only by effectively removing the heat generated from the fuel cell or the battery, and the motor.

Accordingly, in a hybrid vehicle or electric vehicle of a related art, a battery cooling system, a cooling means, and a heat pump system may be configured to have respective separate circuits to prevent heat generation of a motor, an electrical component, and a battery including a fuel cell.

Thus, a size and a weight of a cooling module disposed in the front of the vehicle are increased, and a layout of connecting pipes for supplying a refrigerant or coolant to the heat pump system, the cooling means, and the battery cooling system inside an engine compartment becomes complicated.

Furthermore, since the battery cooling system for heating or cooling the battery is separately provided according to a state of the vehicle so that the battery may operate in an optimal state, a plurality of valves for connecting the respective connecting pipes are applied, thus noise and vibration are transmitted to the interior of the vehicle, resulting in poor ride comfort.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a heat pump system for a vehicle, which is configured for heating up or cooling a battery module by use of a single chiller in which a refrigerant and a coolant exchange heat, simplifying the system.

Various aspects of the present invention are directed to providing a heat pump system for a vehicle, including: a first cooling apparatus including a first radiator and a first water pump connected to a first coolant line, to circulate a coolant in the first coolant line for cooling at least one electrical component and at least one motor mounted on the first coolant line; a second cooling apparatus including a second water pump connected to a second coolant line to circulate a coolant in the second coolant line; and a battery module provided in a battery coolant line which is selectively connectable to the second coolant line through a first valve, wherein a main heat exchanger provided in an air conditioning apparatus is connected to each of the first and second coolant lines to enable the coolants circulating in the first and second cooling apparatuses to pass therethrough, and a refrigerant passing through the main heat exchanger is selectively condensed or evaporated depending on a vehicle mode through mutual heat exchange with the coolant supplied from one of the first coolant line and the second coolant line, or the coolants supplied through the first and second coolant lines, respectively.

The main heat exchanger may include: a first heat dissipation unit connected to the first coolant line; a second heat dissipation unit connected to the second coolant line; and a partition wall partitioning the first heat dissipation unit and the second heat dissipation unit inside the main heat exchanger to prevent mixing of the coolants applied from the first cooling apparatus and the second cooling apparatus, respectively, and to allow the refrigerant to pass therethrough.

The refrigerant passing through the main heat exchanger may flow in a direction which is opposite to a flow direction of the coolants passing through the first heat dissipation unit and the second heat dissipation unit.

It may further include a chiller provided in the battery coolant line through which a coolant passes, and connected to a refrigerant line of the air conditioning apparatus through a refrigerant connection line connected to the refrigerant line, to adjust a temperature of a selectively introduced coolant by heat-exchanging it with a refrigerant supplied from the air conditioning apparatus. The air conditioning apparatus may further include: a heating, ventilation, and air conditioning (HVAC) module connected thereto through the refrigerant line and including a door configured to control outside air passing through an evaporator to be selectively introduced into an internal condenser depending on the vehicle mode including cooling, heating, and heating/dehumidifying modes of the vehicle therein; a compressor configured to be connected between the evaporator and the internal condenser through the refrigerant line; a first expansion valve provided in the refrigerant line to connect the main heat exchanger and the evaporator; a second expansion valve provided in the refrigerant connection line; a first bypass line connecting the refrigerant line and the compressor between the main heat exchanger and the first expansion valve to allow the refrigerant passing through the main heat exchanger to be selectively introduced into the compressor; a third expansion valve provided in the refrigerant line between the internal condenser and the main heat exchanger; and a second bypass line connecting the refrigerant line between the main heat exchanger and the third expansion valve with the refrigerant line between the first expansion valve and the evaporator to allow the refrigerant that has passed through the internal condenser to be selectively introduced into the evaporator.

A sub-condenser may be provided in the refrigerant line between the main heat exchanger and the evaporator.

The sub-condenser may further condense the refrigerant condensed in the main heat exchanger through heat exchange with outside air when the main heat exchanger condenses the refrigerant.

The main heat exchanger may be mounted with a receiver dryer that separates the refrigerant that has completed heat exchange into a gaseous refrigerant and a liquid refrigerant and selectively discharge it.

The receiver dryer may be mounted in the main heat exchanger to supply the gaseous refrigerant to the compressor through the first bypass line, and may supply the liquid refrigerant to the sub-condenser.

The second expansion valve may be operated when the battery module is cooled with a refrigerant, and expands the refrigerant flowing therein through the refrigerant connection line and introduces the expanded refrigerant into the chiller.

The third expansion valve may selectively expand the refrigerant flowing into the main heat exchanger and the second bypass line in the heating and dehumidification mode of the vehicle.

The first valve may selectively connect the second coolant line and the battery coolant line.

In the first cooling apparatus, a first branch line connected to the first coolant line between the first radiator and the first water pump through a second valve provided in the first coolant line between the first radiator and the first water pump is provided.

In the battery cooling apparatus, a second branch line separating the second coolant line and the battery coolant line may be provided so that the battery coolant line forms a closed circuit selectively independent of the second cooling apparatus.

In the second coolant line, a third branch line may be provided for selectively separating the battery coolant line and the second coolant line depending on a selective operation of the first valve.

A first end portion of the first bypass line may be connected to the refrigerant line through a third valve provided in the refrigerant line, and a second end portion of the first bypass line may be connected to the refrigerant line between the evaporator and the compressor.

A fourth valve may be provided in the second bypass line.

The receiver dryer may supply a gaseous refrigerant to the accumulator through the first bypass line which is selectively opened through an operation of the third valve, and may supply the liquid refrigerant to the refrigerant line which is selectively opened through operation of the third valve.

The accumulator may be positioned in the refrigerant line between the compressor and the evaporator.

The second and third expansion valves may each be an electronic expansion valve that selectively expands a refrigerant while controlling a flow of the refrigerant.

The at least one electrical component may include: first and second inverters respectively configured to correspond to front and rear wheels of the vehicle and provided in the first coolant line; and a charger provided in the first coolant line, and the at least one motor may include first and second motors respectively configured to correspond to the front and rear wheels of the vehicle and provided in the first coolant line.

As described above, in accordance with the heat pump system according to various exemplary embodiments of the present invention, the battery module may be heated or cooled depending on the vehicle mode by use of a single chiller in which the coolant and the refrigerant exchange heat in the electric vehicle, facilitating simplification of the system.

Furthermore, according to various exemplary embodiments of the present invention, since a battery module may be efficiently heated and cooled according to a mode of a vehicle, it is possible to operate the battery module at optimal performance, and a total mileage of the vehicle may be increased through efficient management of the battery module.

Furthermore, according to various exemplary embodiments of the present invention, it is possible to improve heating efficiency by selectively using the waste heat of the external heat source, the motor, the electrical component, and the battery module in the heating mode of the vehicle.

Furthermore, according to various exemplary embodiments of the present invention, condensation or evaporation performance of the refrigerant may be increased through the main heat exchanger that condenses or evaporates the refrigerant by use of the respective coolants supplied from first and second cooling apparatuses, improving cooling performance and reducing power consumption of the compressor.

Furthermore, according to various exemplary embodiments of the present invention, the entire system may be simplified to reduce manufacturing cost and weight, and to improve space utilization.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
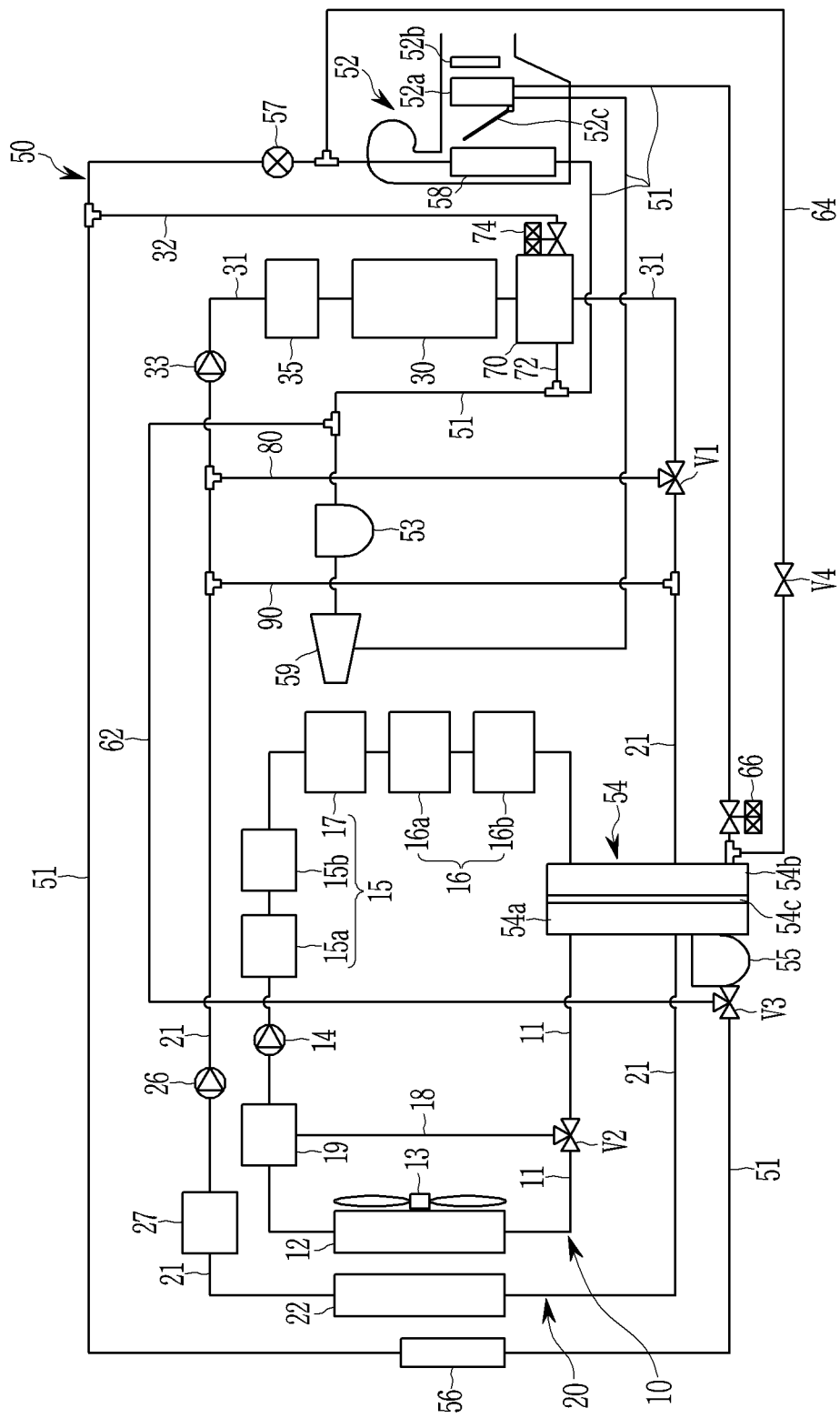
FIG. 1 illustrates a block diagram of a heat pump system for a vehicle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Various exemplary embodiments of the present invention will hereinafter be described in detail with reference to the accompanying drawings.

Since the exemplary embodiments described in the specification and the configurations shown in the drawings are merely the most preferable embodiments and configurations of the present invention, they do not represent all of the technical ideas of the present invention, and it should be understood that various equivalents and modified examples, which may replace the embodiments, are possible, when filing the present application.

To clearly describe the present invention, parts that are irrelevant to the description are omitted, and identical or similar constituent elements throughout the specification are denoted by the same reference numerals.

Since the size and thickness of each configuration shown in the drawings are arbitrarily shown for convenience of description, the present invention is not necessarily limited to configurations illustrated in the drawings, and in order to clearly illustrate several parts and areas, enlarged thicknesses are shown.

Furthermore, throughout the specification unless explicitly described to the contrary, the word "comprise" and variations such as "comprises" or "comprising" will be understood to imply the inclusion of stated elements but not the exclusion of any other elements.

Furthermore, terms such as "unit", "means", "part", and "member" described in the specification mean a unit of a comprehensive configuration having at least one function or operation.

FIG. 1 illustrates a block diagram of a heat pump system for a vehicle according to various exemplary embodiments of the present invention.

According to the exemplary embodiment of the present invention, the heat pump system may adjust a temperature of a battery module 30 by use of a single chiller 70 for performing heat exchange between a refrigerant and a coolant, and may improve heating efficiency by use of waste heat of an electrical component 15, a motor 16, and the battery module 30.

Herein, the heat pump system includes a first cooling apparatus 10 for cooling the electrical component 15 and the motor 16 in an electric vehicle, and a second cooling apparatus 20 for cooling the battery module 30, and an air conditioning apparatus 50 for cooling or heating an internal, which may be interlocked with each other.

Referring to FIG. 1, the heat pump system includes the first and second cooling apparatuses 10 and 20, the battery module 30, and the chiller 70.

First, the first cooling apparatus 10 includes a first radiator 12 and a first water pump 14 connected to a first coolant line 11.

This first cooling apparatus 10 circulates coolant in the first coolant line 11 through operation of the first water pump 14 to cool at least one electrical component 15 and at least one motor 16.

The radiator 12 is disposed in the front of the vehicle, and a cooling fan 13 is disposed behind the radiator 12, so that the coolant is cooled through operation of the cooling fan 13 and heat exchange with the outside air.

Herein, the electrical component 15 may include an electric power control apparatus, an inverter, or an on board charger (OBC) 17. The electric power control apparatus or the inverter may heat up while driving, and the charger 17 may heat up when charging the battery module 30.

Furthermore, the inverter may include first and second inverters 15a and 15b provided in the first coolant line 11 to correspond to front and rear wheels of the vehicle.

Furthermore, the motor 16 may include first and second motors 16a and 16b provided in the first coolant line 11 to correspond to the front and rear wheels of the vehicle.

The electrical component 15 and the motor 16 configured in the instant way may be positioned in series in the first coolant line 11.

Meanwhile, a first reservoir tank 19 is provided in the first coolant line 11 between the first radiator 12 and the first water pump 14. The coolant cooled by the first radiator 12 may be stored in the first reservoir tank 19.

The first cooling apparatus 10 configured in the instant way circulates the coolant cooled from the first radiator 12 through operation of the first water pump 14 along the first coolant line 11 to cool the electrical component 15 and the motor 16 to prevent them from being overheated.

In various exemplary embodiments of the present invention, the second cooling apparatus 20 includes a second radiator 22 and a second water pump 26 connected to a second coolant line 21, and circulates the coolant in the second coolant line 21.

This second cooling apparatus 20 may selectively supply the coolant cooled by the second radiator 22 to the battery module 30.

The second radiator 22 is positioned in front of the first radiator 12 to cool the coolant through operation of the cooling fan 13 and heat-exchange with outside air.

Furthermore, the second reservoir tank 27 is provided in the second coolant line 21 between the second radiator 22 and the second water pump 26. The coolant cooled by the second radiator 22 may be stored in the second reservoir tank 27.

The second cooling apparatus 20 configured in the instant way may circulate the coolant cooled by the second radiator 22 along the second coolant line 21 through operation of the second water pump 26.

Meanwhile, in various exemplary embodiments of the present invention, it is described that the second radiator 22 is provided in the second cooling apparatus 20 as various exemplary embodiments of the present invention, but the present invention is not limited thereto, and the second cooling apparatus 20 may be connected to the first radiator 12 instead of the second radiator 22.

That is, when there is no second radiator 22 in the second cooling apparatus 20, the second coolant line 21 may be connected to the first radiator 12 such that the coolant is supplied from the first radiator 12.

In various exemplary embodiments of the present invention, the battery module 30 is provided in the battery coolant line 31 which is selectively connectable to the second coolant line 21 through a first valve V1.

Herein, the first valve V1 may selectively connect the second coolant line 21 and the battery coolant line 31 between the second radiator 22 and the battery module 30.

In more detail, the first valve V1 selectively connects the second coolant line 21 and the battery coolant line 31 between the chiller 70 provided in the battery coolant line 31 and the second radiator 22.

Herein, the battery module 30 supplies power to the electrical component 15 and the motor 16, and is formed as a water-cooling type which is cooled with the coolant flowing along the battery coolant line 31.

That is, the battery module 30 is selectively connectable to the second cooling apparatus 20 through the battery coolant line 31 according to the operation of the first valve V1. Furthermore, the coolant may be circuited inside the battery module 30 through operation of the third water pump 33 provided in the battery coolant line 31.

The third water pump 33 is operated to circulate coolant through the battery coolant line 31.

Herein, the first, second, and third water pumps 14, 26, and 33 may be electric water pumps.

Meanwhile, the first cooling apparatus 10 may further include a branch line 18 connected to the coolant line 11 between the first radiator 12 and the first water pump 14 through a second valve V2 provided in the first coolant line 11 between the first radiator 12 and the first water pump 14.

The second valve V2 is provided in the first coolant line 11 between the electrical component 15, the motor 16, and the first radiator 12.

A first end portion of the first branch line 18 is connected to the first coolant line 11 through the second valve V2. A second end portion of the first branch line 18 may be connected to the first reservoir tank 19 between the first radiator 12 and the first water pump 14.

The first branch line 18 is selectively opened through operation of the second valve V2 when a temperature of the coolant is increased by absorbing waste heat generated from the electrical component 15 and the motor 16.

In the instant case, the first coolant line 11 connected to the first radiator 12 is closed through operation of the second valve V2.

In various exemplary embodiments of the present invention, the chiller 70 is provided in the battery coolant line 31 so that the coolant passes therein, and is connected to the refrigerant line 51 of the air conditioning apparatus 50 through a refrigerant connection line 72.

The chiller 70 may control a temperature of the coolant by heat-exchanging the coolant selectively introduced therein with the coolant supplied from the air conditioning apparatus 50. Herein, the chiller 70 may be a water-cooled heat exchanger into which a coolant flows.

Meanwhile, a coolant heater 35 may be provided in the battery coolant line 31 between the battery module 30 and the third water pump 33.

When it is required to increase the temperature of the battery module 30, the coolant heater 35 is turned on to heat the coolant circulated in the battery coolant line 31 such that the coolant of which temperature is increased may be supplied to the battery module 30.

This coolant heater 35 may be an electric heater that operates depending on power supply.

Furthermore, the battery coolant line 31 may include a second branch line 80 that connects each battery coolant line 31 between the chiller 70 and the battery module 30 through the first valve V1.

That is, the second branch line 80 selectively separates the second coolant line 21 and the battery coolant line 31 from each other depending on the operation of the first valve V1 such that the battery coolant line 31 forms a closed circuit independent of the second cooling apparatus 20.

A third branch line 90 separating the battery coolant line 31 and the second coolant line 21 is provided in the second coolant line 21.

The third branch line 90 may be selectively connectable to the second coolant line 21 such that the second cooling apparatus 20 forms an independent closed circuit through the second coolant line 21.

Meanwhile, a separate valve may be provided at a point where the third branch line 90 intersects with the second coolant line 21 and the battery coolant line 31 or on the third branch line 90. Such a valve may be a 3-way or two-way valve.

Accordingly, the first valve V1 selectively connects the coolant line 21 and the battery coolant line 31 or selectively connects the battery coolant line 31 and the first branch line 80 to control a flow of the coolant.

That is, when the battery module 30 is cooled by use of the coolant cooled in the second radiator 21, the first valve V1 may connect the coolant line 21 connected to the second radiator 21 with the battery coolant line 31, and may close the first branch line 80.

Accordingly, the coolant cooled by the second radiator 22 may cool the battery module 30 while flowing along the second coolant line 11 and the battery cooling line 31 connected through operation of the first valve V1.

Furthermore, when cooling the battery module 30 by use of the coolant heat-exchanged with the refrigerant, the first valve V1 may open the second branch line 80, and may close the connection between the second coolant line 21 and the battery coolant line 31.

Accordingly, the low-temperature coolant that has completed heat exchanged with the refrigerant in the chiller 70 may flow into the battery module 30 through the second branch line 80 opened by the first valve V1, efficiently cooling the battery module 30.

When the temperature of the battery module 30 is increased, the coolant circulating along the battery coolant line 31 is prevented from flowing into the second radiator 22 through operation of the first valve V1, thus it is possible to rapidly increase the temperature of the battery module 30 by facilitating the coolant heated through operation of the coolant heater 35 to flow into the battery module 30.

In the meantime, according to the exemplary embodiment of the present invention, it has been described that a valve is not configured in the third branch line 90, but the present invention is not limited thereto, and a valve may be applied as necessary for selective opening of the third branch line 90.

That is, the third branch line 90 may be controlled to be opened or closed by controlling a flow of the coolant circulating through operations of the second coolant line 21 selectively connectable depending on each mode of the vehicle (heating, cooling, or dehumidification), the battery coolant line 31, the second branch line 80, and the second and third water pumps 26 and 33.

Meanwhile, in various exemplary embodiments of the present invention, the air conditioning apparatus 50 includes a heating, ventilation, and air conditioning (HVAC) module 52, the main heat exchanger 54, a receiver dryer 55, a first expansion valve 57, an evaporator 58, and a compressor 59 which are connected through the refrigerant line 51.

First, the HVAC module 52 includes an opening and closing door 52*c* connected through the refrigerant line 51, for controlling outside air passing through the evaporator 58 to selectively flow into the internal condenser 52*a* and the internal heater 52*b* depending on a cooling mode, a heating mode, and a heating and dehumidification mode.

That is, the opening and closing door 52*c* is opened to allow the outside air passing through the evaporator 58 to be introduced into the internal condenser 52*a* and the internal heater 52*b* in the heating mode of the vehicle. In contrast, in the cooling mode of the vehicle, the opening and closing door 52*c* closes off the internal condenser 52*a* and the internal heater 52*b* such that the outside air which is cooled while passing through the evaporator 58 directly flows into the vehicle.

The main heat exchanger 54 may be connected to the refrigerant line 51 to enable the refrigerant to pass therethrough, and may be respectively connected to the first and second coolant lines 11 and 21 such that the coolant circulating in the first and second cooling apparatuses 10 and 20 passes therethrough.

The main heat exchanger 54 may condense or evaporate the refrigerant through heat exchange with the coolants supplied through the first and second coolant lines 11 and 21 depending on the vehicle mode.

That is, the refrigerant passing through the main heat exchanger 54 may be selectively condensed or evaporated through mutual heat exchange with the coolant supplied from any one of the first coolant line 11 and the second coolant line 21 or the coolants supplied through the first and second coolant lines 11 and 21 depending on the cooling mode or the heating mode of the vehicle.

The main heat exchanger 54 may be a water-cooled heat exchanger into which a coolant flows.

In the main heat exchanger 54 configured in the present way, respective coolants having different temperatures circulating through the first cooling apparatus 10 and the second cooling apparatus 20 flow, and at the instant time, the refrigerant may be heat exchanged with each coolant having a different temperature.

The main heat exchanger 54 will be described in more detail with reference to FIG. 2.

Figure 2:
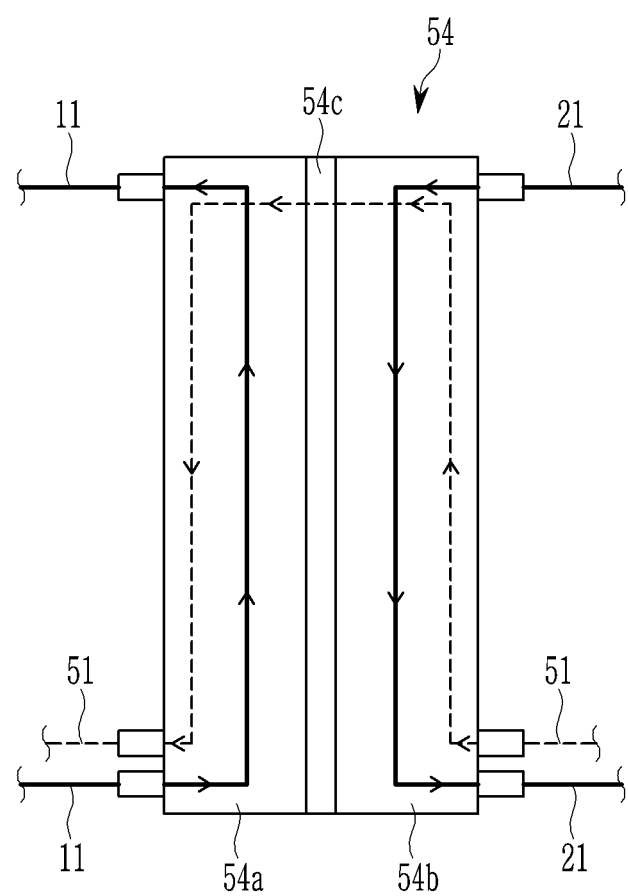
FIG. 2 illustrates a schematic diagram of a main heat exchanger applied to a heat pump system for a vehicle according to various exemplary embodiments of the present invention.

FIG. 2 illustrates a schematic diagram of a main heat exchanger applied to a heat pump system for a vehicle according to various exemplary embodiments of the present invention.

Referring to FIG. 2, the main heat exchanger 54 may include a first heat dissipation unit 54*a*, a second heat dissipation unit 54*b*, and a partition wall 54*c*.

First, the first heat dissipation unit 54*a* is connected to the first coolant line 11. Accordingly, the first heat dissipation unit 54*a* may exchange heat with the refrigerant supplied from the compressor 59 with the coolant supplied from the first cooling apparatus 10.

The second heat dissipation unit 54*b* is connected to the second coolant line 21. Accordingly, the second heat dissipation unit 54*b* may exchange heat with the coolant that has passed through the first heat dissipation unit 54*a* with the coolant supplied from the second cooling apparatus 20.

The partition wall 54*c* may partition the first heat dissipation unit 54*a* and the second heat dissipation unit 54*b* inside the main heat exchanger 54 to prevent mixing of the coolants respectively supplied from the first cooling apparatus 10 and the second cooling apparatus 20.

The partition wall 54*c* may enable the refrigerant to pass therethrough such that the refrigerant flows from the second heat dissipation unit 54*b* to the first heat dissipation unit 54*a*.

Herein, the refrigerant passing through the main heat exchanger 54 may flow in a direction which is opposite to a flow direction of the coolants passing through the first heat dissipation unit 54*a* and the second heat dissipation unit 54*b*.

That is, the refrigerant moves from a lower portion to an upper portion of the second heat dissipation unit 54*b* with reference to FIG. 2. Thereafter, the refrigerant moves from the upper portion of the second heat dissipation unit 54*b* to the first heat dissipation unit 54*a* through the partition wall 54*c*, and moves from an upper portion to a lower portion of the first heat dissipation unit 54*a*.

In the instant case, the coolant supplied from the first cooling apparatus 10 flows from the lower portion to the upper portion of the first dissipation unit 54*a* to flow in an opposite direction to that of the refrigerant.

The coolant supplied from the second cooling apparatus 20 flows from the upper portion to the lower portion of the second dissipation unit 54*b* to flow in the opposite direction to that of the refrigerant.

The main heat exchanger 54 configured in the instant way may heat-exchange the refrigerant supplied from the compressor 59 through the internal condenser 52*a* with the coolant, supplied from any one of the first coolant line 11 and the second coolant line 21 or the coolants respectively supplied through the first and second coolant lines 11 and 21, in the first heat dissipation unit 54*a* or the second heat dissipation unit 54*b*.

Through the present operation, the main heat exchanger 54 may increase a condensation or evaporation amount of the refrigerant.

In various exemplary embodiments of the present invention, the receiver dryer 55 may separate the refrigerant that has completed heat exchange in the main heat exchanger 54 into a gaseous refrigerant and a liquid refrigerant and selectively discharge it. The receiver dryer 55 may be integrally mounted to the main heat exchanger 54.

Meanwhile, the refrigerant line 51 between the main heat exchanger 54 and the evaporator 58 may be provided with a sub-condenser 56 for additionally condensing the refrigerant that has passed through the main heat exchanger 54.

The sub-condenser 56 is positioned in front of the second radiator 22 to exchange heat between the refrigerant flowing therein and the outside air.

Accordingly, when the main heat exchanger 54 condenses the refrigerant, the sub-condenser 56 may increase subcooling of the refrigerant by further condensing the refrigerant condensed in the main heat exchanger 54, improving a coefficient of performance (COP), which is a coefficient of the cooling capacity relative to the power required by the compressor.

In various exemplary embodiments of the present invention, the first expansion valve 57 is provided in the refrigerant line 51 connecting the sub-condenser 56 and the evaporator 58. The first expansion valve 57 receives the refrigerant passing through the sub-condenser 56 to expand it. The first expansion valve 57 may be a mechanical expansion valve.

The compressor 59 is connected thereto between the evaporator 58 and the internal condenser 54 through the refrigerant line 51. This compressor 59 may compress the gaseous refrigerant and supply the compressed refrigerant to the internal condenser 52a.

The air conditioning apparatus 50 configured in the instant way may further include a second expansion valve 74, a first bypass line 62, a third expansion valve 66, and a second bypass line 64.

First, the second expansion valve 74 is provided in the refrigerant connection line 72 between the sub-condenser 56 and the chiller 70.

Herein, the second expansion valve 74 is operated when the battery module 30 is cooled with the refrigerant in the cooling mode of the vehicle. The second expansion valve 72 may expand the refrigerant introduced through the refrigerant connection line 72 to introduce it into the chiller 70.

The second expansion valve 74 may introduce the condensed refrigerant exhausted from the sub-condenser 56 into the chiller 70 in a state where the temperature of the refrigerant is reduced by expanding the refrigerant, to further reduce the temperature of the coolant passing through the interior of the chiller 70.

As a result, the coolant having the temperature which is reduced while passing through the chiller 70 is introduced into the battery module 30, being more efficiently cooled.

In various exemplary embodiments of the present invention, the first bypass line 62 may connect the refrigerant line 51 and the compressor 59 between the main heat exchanger 54 and the first expansion valve 57 such that the gaseous refrigerant that has passed through the receiver dryer 55 is selectively introduced into the compressor 59.

Herein, a first end portion of the first bypass line 62 is connected to the refrigerant line 21 through a third valve V3 provided in the refrigerant line 51.

A second end portion of the first bypass line 62 may be connected to the refrigerant line 51 between the evaporator 58 and the compressor 59.

The third valve V3 may selectively open the first bypass line 62 depending on a vehicle mode.

Accordingly, the first bypass line 62 opened through operation of the third valve V3 may supply the gaseous refrigerant that has passed through the receiver dryer 55 to the compressor 59 in the heating mode of the vehicle.

Furthermore, the receiver dryer 55 may supply liquid refrigerant to the sub-condenser 6 through the refrigerant line 51 which is opened through operation of the third valve V3.

That is, the receiver dryer 55 may supply the gaseous refrigerant to the accumulator 53 through the first bypass line 62 which is selectively opened through operation of the third valve V3.

Furthermore, the receiver dryer 55 may supply liquid refrigerant to the refrigerant line 51 which is selectively opened through operation of the third valve V3.

Herein, the accumulator 53 may be positioned in the refrigerant line 51 between the compressor 59 and the evaporator 58.

The accumulator 53 selectively receives the refrigerant discharged from the receiver dryer 55 through operation of the third valve V3 which operates depending on the vehicle mode.

That is, the accumulator 53 improves efficiency and durability of the first compressor 59 by supplying only a gaseous refrigerant to the first compressor 59.

In various exemplary embodiments of the present invention, the third expansion valve 66 may be provided in the refrigerant line 51 between the internal condenser 52a and the main heat exchanger 54.

The third expansion valve 66 may selectively expand the refrigerant flowing into the main heat exchanger 54 and the second bypass line 64 in the heating and dehumidification mode of the vehicle.

Herein, the main heat exchanger 54 may evaporate the refrigerant through heat exchange with the coolant when the third expansion valve 66 expands the refrigerant, and may condense the refrigerant through heat exchange with the coolant when the third expansion valve 66 does not expand the refrigerant.

Furthermore, the second bypass line 64 may connect the refrigerant line 51 between the main heat exchanger 54 and the third expansion valve 66 with the refrigerant line 51 between the first expansion valve 57 and the evaporator 58 such that some of the refrigerant that has passed through the internal condenser 52a is selectively introduced into the evaporator 58.

Herein, a fourth valve V4 may be provided in the second bypass line 64. The fourth valve V4 may selectively open the second bypass line 64 in the dehumidification mode among the vehicle modes.

Accordingly, indoor dehumidification may be performed without the operation of the first expansion valve 57 to allow the second bypass line 64 to introduce some of the refrigerant expanded through operation of the third expansion valve 66 into the evaporator 58 in the heating and dehumidification mode of the vehicle.

In the heat pump system configured as described above, the second expansion valve 74 and the third expansion valve 66 may be electronic expansion valves that selectively expand the refrigerant while controlling the flow of the refrigerant.

Furthermore, the first, second, and third valves V1, V2, and V3 may be three-way valves configured for distributing a flow, and the fourth valve V4 may be a two-way valve.

In an exemplary embodiment of the present invention, a controller is connected to at least one of the elements of the heat pump system, to control the operations thereof.

Therefore, as described above, when the vehicle heat pump system according to various exemplary embodiments of the present invention is applied, the battery module 30 may be heated or cooled depending on the vehicle mode by use of the single chiller 70 in which the coolant and the refrigerant exchange heat in the electric vehicle, facilitating simplification of the system.

Furthermore, according to various exemplary embodiments of the present invention, optimal performance of the battery module 30 becomes possible by efficiently increasing the temperature and cooling the battery module 30 depending on a vehicle mode, and overall mileage of the vehicle may be increased through efficient management of the battery module 30.

Furthermore, according to various exemplary embodiments of the present invention, heating efficiency may be improved by selectively using an external heat source, and waste heat of the electrical equipment 15, the motor 16, and the battery module 30 in the heating mode of the vehicle.

Furthermore, according to various exemplary embodiments of the present invention, condensation or evaporation performance of the refrigerant may be increased through the main heat exchanger 54 that condenses or evaporates the refrigerant by use of the respective coolants supplied from the first and second cooling apparatuses 10 and 20, improving cooling performance and reducing power consumption of the compressor 59.

Furthermore, according to various exemplary embodiments of the present invention, the entire system may be simplified to reduce manufacturing cost and weight, and to improve space utilization.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A heat pump system for a vehicle, the heat pump system comprising:
    a first cooling apparatus including a first radiator and a first water pump connected to a first coolant line, to circulate a coolant in the first coolant line for cooling at least one electrical component and at least one motor mounted on the first coolant line;
    a second cooling apparatus including a second water pump connected to a second coolant line to circulate a coolant in the second coolant line; and
    a battery module provided in a battery coolant line which is selectively connectable to the second coolant line through a first valve,
    wherein a main heat exchanger provided in an air conditioning apparatus is connected to each of the first and second coolant lines to enable the coolants circulating in the first and second cooling apparatuses to pass therethrough, and
    wherein a refrigerant passing through the main heat exchanger is selectively condensed or evaporated depending on a vehicle mode through mutual heat exchange with the coolant supplied from one of the first coolant line and the second coolant line, or the coolants supplied
    through the first and second coolant lines, respectively,
    wherein a chiller provided in the battery coolant line through which a coolant passes, and connected to a refrigerant line of the air conditioning apparatus through a refrigerant connection line connected to the refrigerant line, to adjust a temperature of a selectively introduced coolant by heat-exchanging the selectively introduced coolant with a refrigerant supplied from the air conditioning apparatus, and
    wherein the air conditioning apparatus includes:
        a heating, ventilation, and air conditioning (HVAC) module connected to the refrigerant line and including a door, an evaporator, and an internal condenser, wherein the door is configured to control outside air passing through the evaporator connected to the refrigerant line to be selectively introduced into the internal condenser connected to the refrigerant line depending on the vehicle mode including a cooling mode, a heating mode, and a heating and dehumidifying mode of the vehicle therein;
        a compressor mounted in connected to the refrigerant line and connected between the evaporator and the internal condenser through the refrigerant line;
        a first expansion valve provided in the refrigerant line to connect the main heat exchanger and the evaporator;
        a second expansion valve provided in the refrigerant connection line;
        a first bypass line connecting the refrigerant line and the compressor between the main heat exchanger and the first expansion valve to allow the refrigerant passing through the main heat exchanger to be selectively introduced into the compressor;
        a third expansion valve provided in the refrigerant line between the internal condenser and the main heat exchanger; and
        a second bypass line connecting the refrigerant line between the main heat exchanger and the third expansion valve with the refrigerant line between the first expansion valve and the evaporator to allow the refrigerant that has passed through the internal condenser to be selectively introduced into the evaporator,
    wherein a sub-condenser is provided in the refrigerant line between the main heat exchanger and the evaporator,
    wherein the main heat exchanger is mounted with a receiver dryer that separates the refrigerant that has completed heat exchange into a gaseous refrigerant and a liquid refrigerant and selectively discharges the refrigerant, and
    wherein the receiver dryer is mounted in the main heat exchanger to supply the gaseous refrigerant to the compressor through the first bypass line connecting the receiver dryer and the compressor, and supplies the liquid refrigerant to the sub-condenser.

2. The heat pump system of claim 1, wherein the main heat exchanger includes:
    a first heat dissipation unit connected to the first coolant line;
    a second heat dissipation unit connected to the second coolant line; and a partition wall partitioning the first heat dissipation unit and the second heat dissipation unit inside the main heat exchanger to prevent mixing of the coolants applied from the first cooling apparatus and the second cooling apparatus, respectively, and to allow the refrigerant to pass therethrough.

3. The heat pump system of claim 2, wherein the refrigerant passing through the main heat exchanger flows in a direction which is opposite to a flow direction of the coolants passing through the first heat dissipation unit and the second heat dissipation unit.

4. The heat pump system of claim 1, wherein the sub-condenser is configured to further condense the refrigerant condensed in the main heat exchanger through heat exchange with outside air when the main heat exchanger condenses the refrigerant.

5. The heat pump system of claim 1, wherein the second expansion valve is operated when the battery module is cooled with a refrigerant, and expands the refrigerant flowing therein through the refrigerant connection line and introduces the expanded refrigerant into the chiller.

6. The heat pump system of claim 1, wherein the third expansion valve selectively expands the refrigerant flowing into the main heat exchanger and the second bypass line in the heating and dehumidification mode of the vehicle.

7. The heat pump system of claim 1, wherein the first valve selectively connects the second coolant line and the battery coolant line.

8. The heat pump system of claim 1, wherein, in the first cooling apparatus, a first branch line connected to the first coolant line between the first radiator and the first water pump through a second valve provided in the first coolant line between the first radiator and the first water pump is provided.

9. The heat pump system of claim 1, wherein, in the battery cooling apparatus, a second branch line selectively separating the second coolant line and the battery coolant line is provided so that the battery coolant line forms a closed circuit selectively independent of the second cooling apparatus through the first valve.

10. The heat pump system of claim 1, wherein, in the second coolant line, a third branch line is provided for selectively separating the battery coolant line and the second coolant line depending on a selective operation of the first valve.

11. The heat pump system of claim 1,
wherein a first end portion of the first bypass line is connected to the refrigerant line through a third valve provided in the refrigerant line, and
wherein a second end portion of the first bypass line is connected to the refrigerant line between the evaporator and the compressor.

12. The heat pump system of claim 1, wherein a fourth valve is provided in the second bypass line.

13. The heat pump system of claim 11, wherein the receiver dryer
supplies a gaseous refrigerant to an accumulator mounted in the refrigerant line through the first bypass line which is selectively opened through an operation of the third valve, and
supplies the liquid refrigerant to the refrigerant line which is selectively opened through operation of the third valve.

14. The heat pump system of claim 13, wherein the accumulator is positioned in the refrigerant line between the compressor and the evaporator.

15. The heat pump system of claim 1, wherein the second and third expansion valves are each an electronic expansion valve that selectively expands a refrigerant while controlling a flow of the refrigerant.

16. The heat pump system of claim 1, wherein the at least one electrical component includes:
first and second inverters respectively corresponding to front and rear wheels of the vehicle and provided in the first coolant line; and
a charger provided in the first coolant line,
wherein the at least one motor includes first and second motors respectively corresponding to the front and rear wheels of the vehicle and provided in the first coolant line.

* * * * *